(No Model.)
E. FLUEHR.
NUT LOCK.
No. 570,789. Patented Nov. 3, 1896.
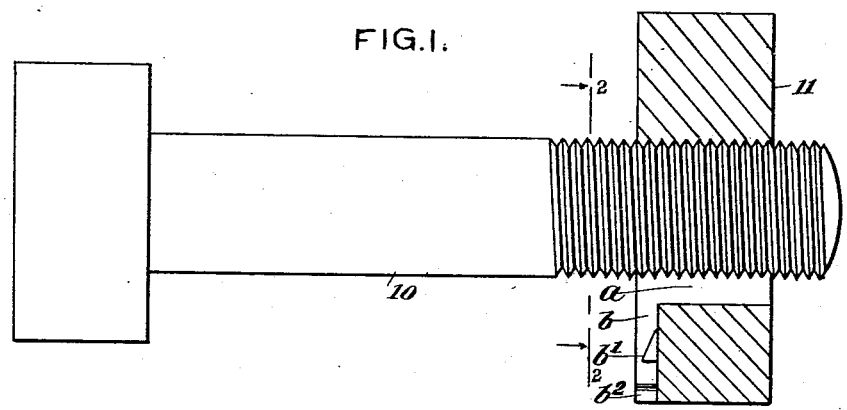
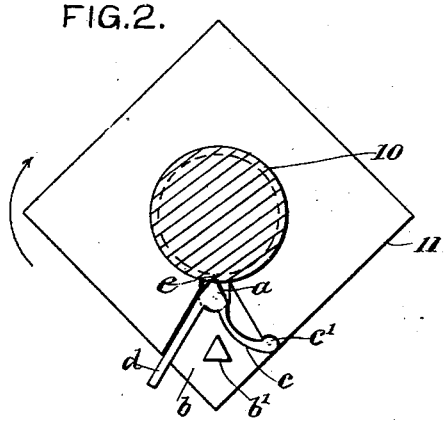
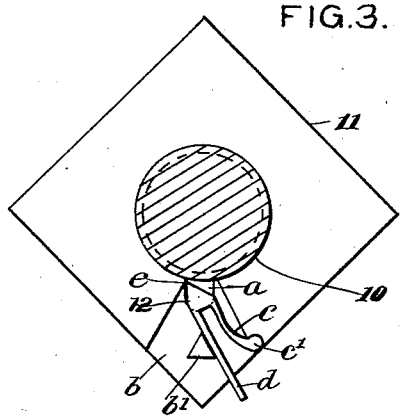
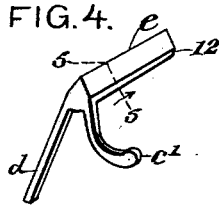
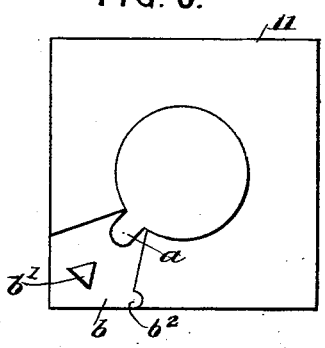
WITNESSES:
Donn Fritchell
Wm. L. Patton
INVENTOR
E. Fluehr
BY
Munn & Co
ATTORNEYS.
THE NORRIS PETERS CO., PHOTO-LITHO., WASHINGTON, D. C.

UNITED STATES PATENT OFFICE.

EMILE FLUEHR, OF SPRAGUE, WASHINGTON.

NUT-LOCK.

SPECIFICATION forming part of Letters Patent No. 570,789, dated November 3, 1896.

Application filed July 15, 1896. Serial No. 599,244. (No model.)

*To all whom it may concern:*

Be it known that I, EMILE FLUEHR, of Sprague, in the county of Lincoln and State of Washington, have invented a new and Improved Nut-Lock, of which the following is a full, clear, and exact description.

This invention relates to nut-locks of a type wherein a spring-pressed locking-key is employed to hold a nut on a threaded bolt, and has for its object to provide a novel, simple nut-lock of the indicated type, which will be inexpensive to manufacture and that will be effective in service.

The invention consists in the construction and combination of parts, as is hereinafter described, and indicated in the claims.

Reference is to be had to the accompanying drawings, forming a part of this specification, in which similar characters of reference indicate corresponding parts in all the figures.

Figure 1 is a side view of a bolt and a partly sectional nut thereon adapted to receive the improved nut-lock. Fig. 2 is a transverse sectional view of a bolt and a nut thereon having the improvements applied, the section being taken on the line 2 2 in Fig. 1. Fig. 3 is a view of parts similar with that shown in Fig. 2, but showing the features of improvement differently adjusted. Fig. 4 is an enlarged detached perspective view of a sharp-edged locking-bar and limbs thereon, which is the main portion of the nut-lock. Fig. 5 is a transverse sectional view on the line 5 5 in Fig. 4; and Fig. 6 is an end view of a nut having part of the improvements comprising a shallow recess therein, a projecting catch on the bottom of the recess, and a transverse groove in the threaded aperture of the nut.

The improved nut-lock may be applied to any threaded bolt and nut therefor, if the latter has sufficient area on one end to permit an effective application of the locking device.

In the drawings, 10 represents a common screw-bolt, and 11 the nut therefor, having some features of the improvement.

A groove $a$ is interiorly formed in the nut 11 across its thread, having sufficient width and depth to freely receive a member of the nut-locking device that will presently be described. On the end of the nut 11 which is nearest to the head of the bolt in service a shallow recess $b$ is produced, and the groove $a$ and recess $b$ are located opposite one corner of the nut, as best shown in Fig. 6. The side walls of the recess that is level on the bottom extend divergently from the sides of the groove $a$, so as to embrace the corner of the nut that is near the groove and take in parts of two sides of the nut at the end wherein said recess is produced.

The nut-lock proper comprises a locking-bar 12, having two spring-limbs $c$ and $d$ formed thereon at one end, as clearly shown in Fig. 4. The locking-bar 12 is preferably rounded on the corner from which the limbs $c$ and $d$ project and has the opposite corner $e$ produced by the acute convergence of the sides forming said corner, that is rendered somewhat sharp thereby, as clearly represented in Fig. 6. The limb $c$ is laterally curved and preferably terminates in an enlargement or toe $c'$ at its free end. The other limb $d$ is straight in the body and of such a length as will permit it to project beyond the side of the nut when in operative position thereon.

In the recess $b$ a detent hook $b'$ is slightly projected from its bottom between the diverging sides of the same, and at an appropriate outer corner of the recess a notch is produced, as shown at $b^2$, for reception of the toe $c'$.

The construction of the nut-lock herein shown and described is for a bolt and nut having a right-hand thread, and for a nut-lock that is to engage with a left-hand threaded bolt and nut the location of the limbs $c\ d$ is reversed.

In applying the device the locking-bar 12 is introduced within the groove $a$ of the nut 11, its rounded side resting on the bottom of said groove, while the limbs $c\ d$, respectively, have contact with the divergent sides of the recess $b$, the toe $c'$ occupying the notch $b^2$, as indicated in Fig. 2, whereby the limb $c$ is prevented from displacement.

It will be seen that if the nut 11 is screwed on the bolt 10 in direction of the curved arrow in Fig. 2, so as to bear on material to be clamped by the bolt after the nut-lock is in position thereon, the limb $d$ is adapted to force the edge $e$ of the locking-bar toward the threaded periphery of the bolt. The locking-bar 12 thus rocked into engagement with the thread of the bolt locks the nut if an attempt to unscrew the latter is made. To release the nut, the limb $d$ is pressed toward the catch $b'$ and caused to hook thereon, which will remove the sharp edge of the locking-bar from the bolt, and thus permit a rotation of the nut for its removal from the bolt.

Having thus described my invention, I claim as new and desire to secure by Letters Patent—

1. A nut-lock, comprising a nut recessed on one end and grooved across its thread, the sides of the groove and converging sides of the recess joining at adjacent ends, and a locking-bar having a sharp edge and two angularly-diverging spring-limbs occupying the recess, said limbs bearing against the side walls of the recess, whereby the locking-bar is adapted to rock in the groove of the nut and engage its sharp edge transversely with the thread of a screw-bolt whereon the nut is screwed, substantially as described.

2. A nut-lock, comprising a nut having a groove across its thread and a shallow recess in one end of said nut, the groove and recess being located at one corner of said nut, and a locking-bar having a sharp edge and adapted to laterally rock in the groove of the nut, said bar being furnished with two spring-limbs that diverge and contact respectively with sides of the recess, the edge of the bar being adapted to press on the thread of a bolt having the nut thereon, when said nut is unscrewed from the bolt, substantially as described.

3. A nut-lock, comprising a nut having a groove across its thread, a shallow recess in one end of the nut embracing a corner thereof, and having divergent sides, a detent-catch projecting from the bottom of the recess intermediate of its side walls, and a locking-bar having a sharp edge, said bar being rounded on its opposite edge and thus adapted to rock in the groove of the nut, two spring-limbs on one end of the bar diverging so as to contact with the sides of the recess in the nut when located therein, one longer straight limb on the locking-bar causing said bar to rock its sharp edge into locking engagement with the thread of a bolt whereon the nut is screwed when diverged from the other limb, and be released when said limb is hooked over the detent-catch of the nut, substantially as described.

EMILE FLUEHR.

Witnesses:
N. T. CATON,
P. W. JOHNSON.